(12) United States Patent
Mariech et al.

(10) Patent No.: US 12,609,584 B2
(45) Date of Patent: Apr. 21, 2026

(54) SYSTEM AND METHOD FOR SUPPLYING ELECTRICAL POWER VIA AN AXLE

(71) Applicant: DANA ITALIA S.R.L., Trentino (IT)

(72) Inventors: Giovanni Mariech, Rovereto (IT); Mario Bonora, Tenno (IT); Alessandro Strauss, Rovereto (IT); Alberto Cis, Ledro (IT)

(73) Assignee: DANA ITALIA S.R.L., Arco (IT)

( * ) Notice: Subject to any disclaimer, the term of this patent is extended or adjusted under 35 U.S.C. 154(b) by 559 days.

(21) Appl. No.: 18/058,052

(22) Filed: Nov. 22, 2022

(65) Prior Publication Data

US 2024/0171042 A1 May 23, 2024

(51) Int. Cl.
| | |
|---|---|
| *H02K 7/18* | (2006.01) |
| *B60B 35/00* | (2006.01) |
| *B60B 35/12* | (2006.01) |
| *B60R 16/03* | (2006.01) |

(52) U.S. Cl.
CPC ........... *H02K 7/1846* (2013.01); *B60B 35/00* (2013.01); *B60B 35/12* (2013.01); *B60B 35/122* (2013.01); *B60R 16/0307* (2013.01)

(58) Field of Classification Search
CPC .......... B60L 50/61; B60K 6/26; B60W 10/08; B60W 30/18127; Y02T 10/62; H02K 7/1846; B60R 16/0307; B60R 16/02; B60B 35/00; B60B 35/12; B60B 35/122
USPC ....................................................... 310/67 R
See application file for complete search history.

(56) References Cited

U.S. PATENT DOCUMENTS

| | | | | | |
|---|---|---|---|---|---|
| 6,082,476 | A | * | 7/2000 | Stulbach | H02J 7/14 |
| | | | | | 180/65.265 |
| 8,397,588 | B2 | * | 3/2013 | Kang | B62D 6/10 |
| | | | | | 73/862.08 |
| 2009/0240604 | A1 | * | 9/2009 | Thurston | G06Q 10/087 |
| | | | | | 705/29 |
| 2015/0197243 | A1 | * | 7/2015 | Johri | B60W 20/12 |
| | | | | | 180/65.265 |
| 2017/0129298 | A1 | * | 5/2017 | Lu | B60G 17/015 |
| 2018/0231395 | A1 | * | 8/2018 | Creech | F16H 48/08 |
| 2022/0351554 | A1 | | 11/2022 | Keluskar et al. | |
| 2024/0171042 | A1 | * | 5/2024 | Mariech | H02K 7/1846 |

FOREIGN PATENT DOCUMENTS

| | | | | |
|---|---|---|---|---|
| DE | 102007015996 | A1 * | 10/2008 | H02J 7/14 |
| JP | 5052084 | B2 | 10/2012 | |

OTHER PUBLICATIONS

CN 101887639 (Year: 2010).*
Dynamo vs generator—Google Search (Year: 2025).*
Generators and Dynamos—Edison Tech Center (Year: 2011).*

* cited by examiner

*Primary Examiner* — Ahmed Elnakib
(74) *Attorney, Agent, or Firm* — McCoy Russell LLP

(57) ABSTRACT

Methods and systems for generating power at a vehicle axle to supply sensors and/or actuators are described. In one example, the power is generated via a dynamo that converts rotation of an axle component into electrical energy. The electrical energy may be supplied to a battery, vehicle sensors, and vehicle actuators so that wires may not be routed between a controller and the axle.

20 Claims, 6 Drawing Sheets

144

161

175

130

142

143

145

123

204

202

222

220

221

181B

181

181A

181C

200

SYSTEM AND METHOD FOR SUPPLYING ELECTRICAL POWER VIA AN AXLE

TECHNICAL FIELD

The present disclosure relates to a method and system for supplying electrical power to sensors and/or actuators of an axle of a vehicle. The method and systems may be applied to an electrified axle or an axle that is supplied with mechanical power via an external power source.

BACKGROUND AND SUMMARY

An axle of a vehicle translates rotary motion provided by a propulsion source into linear vehicle motion. Additionally, the axle may also carry the weight of the vehicle as well as part of any load that may be put on the vehicle. Sensors and actuators may be placed at various locations of the axle to provide feedback and control functions. The sensors and actuators are typically coupled to a vehicle controller via wiring. The wiring may support carrying power to the sensors and actuators as well as signals that provide feedback and control for the axle. However, the each sensor utilizes dedicated wiring for signals and power, which can lead to significant numbers of cables and connectors. The cabling and connectors may increase axle assembly time and a possibility of signal and control degradation. Therefore, it may be desirable to provide a way of operating axle sensors in a way that may reduce axle assembly time and a possibility of signal and control degradation.

The inventors herein have recognized the above-mentioned issues and have developed a method for operating an axle of a vehicle, comprising: generating electrical power via a component of the axle; and supplying the generated electrical power to an electrical power consumer of the axle.

By converting rotational energy within an axle to electrical energy, it may be possible to provide the technical result of eliminating wiring and connections between a controller and electrical devices of an axle. For example, the rotational energy of a ring gear or axle shaft may be converted into electrical energy via a dynamo. The dynamo may supply electrical energy to axle sensors and actuators. The axle sensors may transmit a vehicle state (e.g., oil temperature, axle speed, weight applied to an axle, suspension height, steering angle, etc.) to a controller wirelessly. Further, axle actuators may be operated using the electrical energy to lock the axle during conditions when wheel slip is detected.

The present description may provide several advantages. In particular, the approach may reduce vehicle assembly time. In addition, the approach may provide increased sensor reliability. Further, the approach may reduce the possibility of sensor/actuator wire wear degradation that may be caused by exposure to environmental elements.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
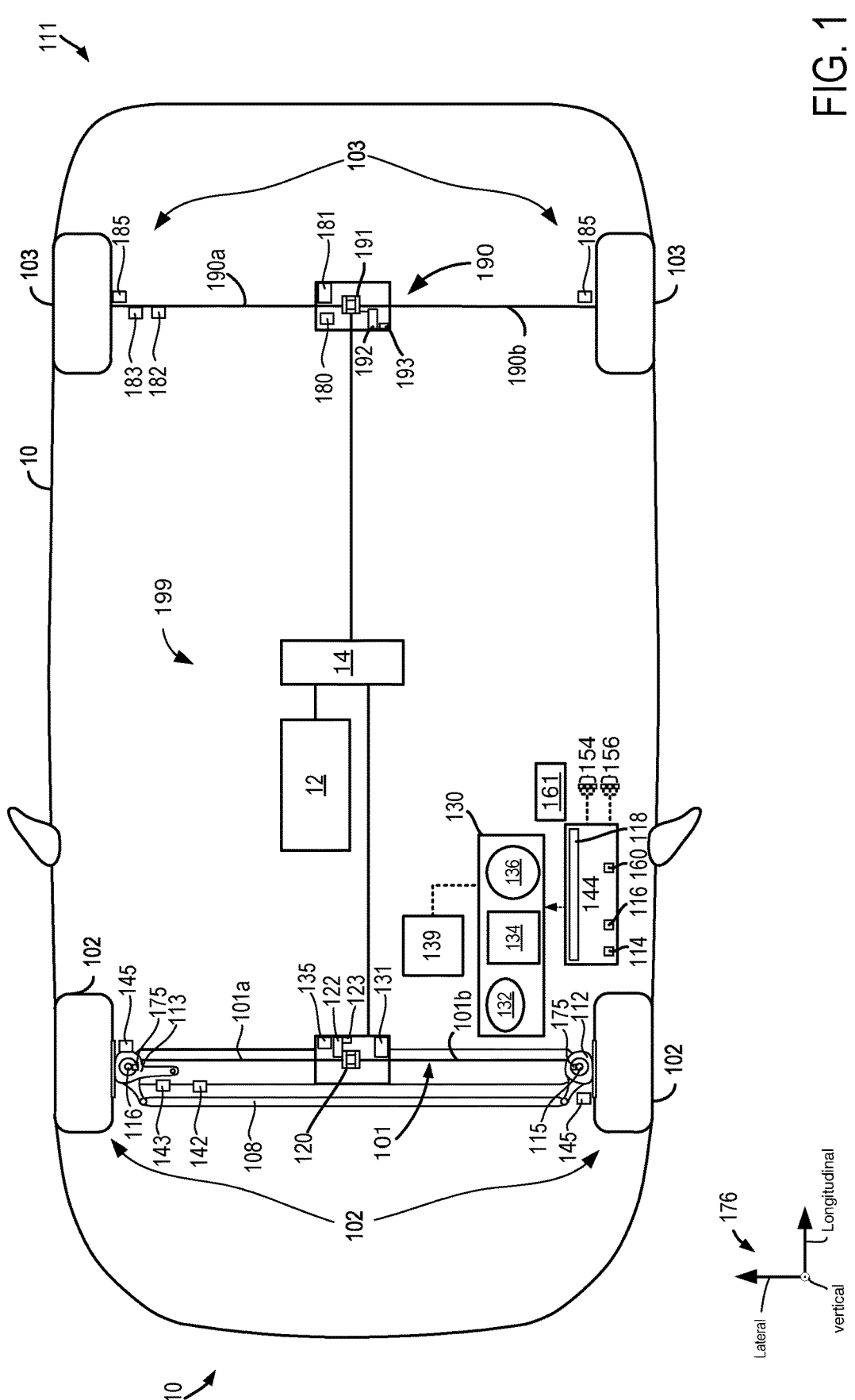
FIG. 1 is a schematic diagram of a driveline assembly and axles is shown.
Figure 2:
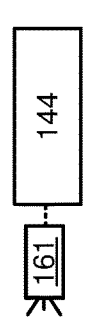
FIG. 2 shows a schematic of an example circuit for powering axle sensors and actuators.
Figure 2:
Figure 4:
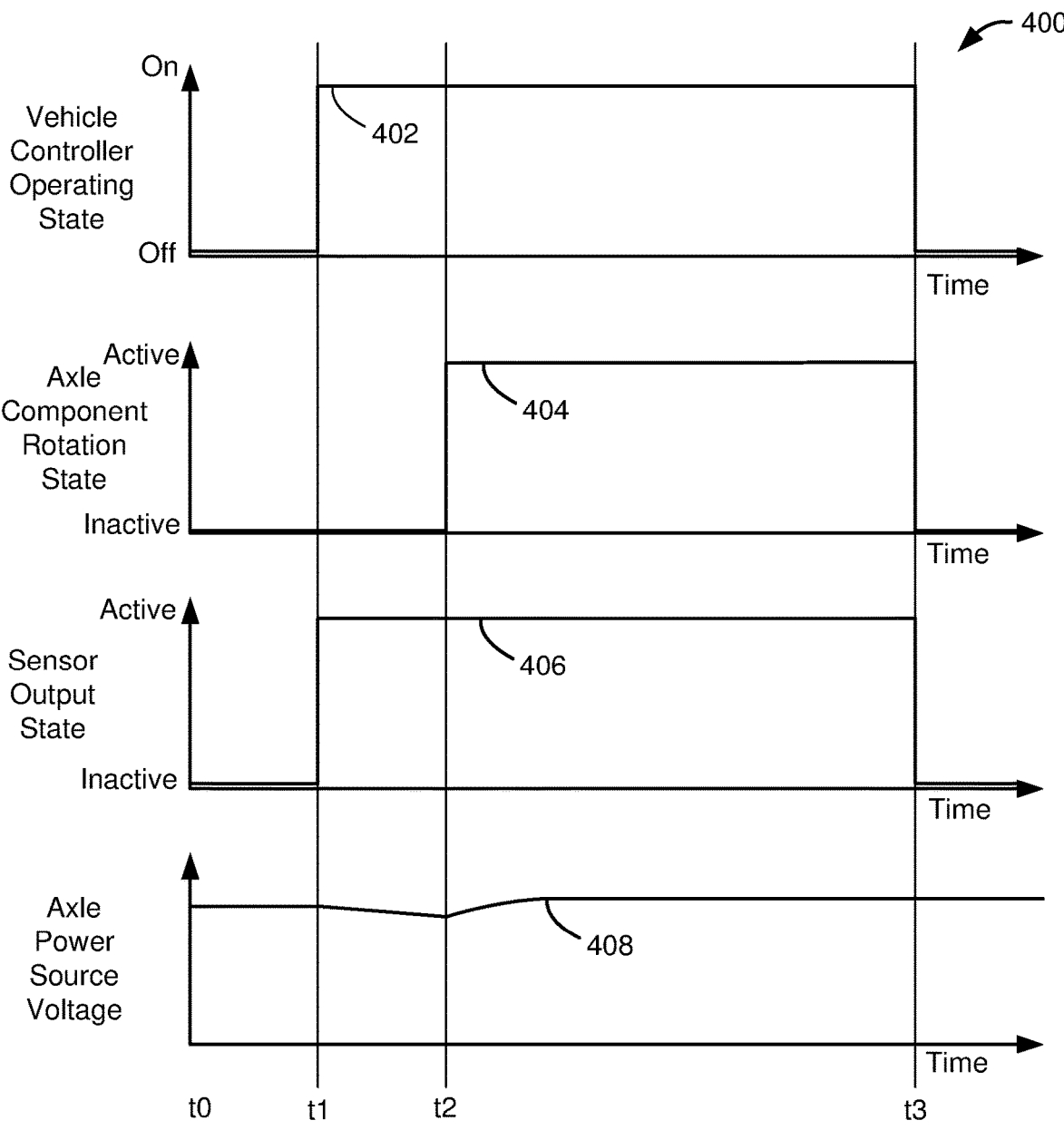
FIG. 4 shows an example sequence for powering sensors and actuators of an axle.
Figure 5:
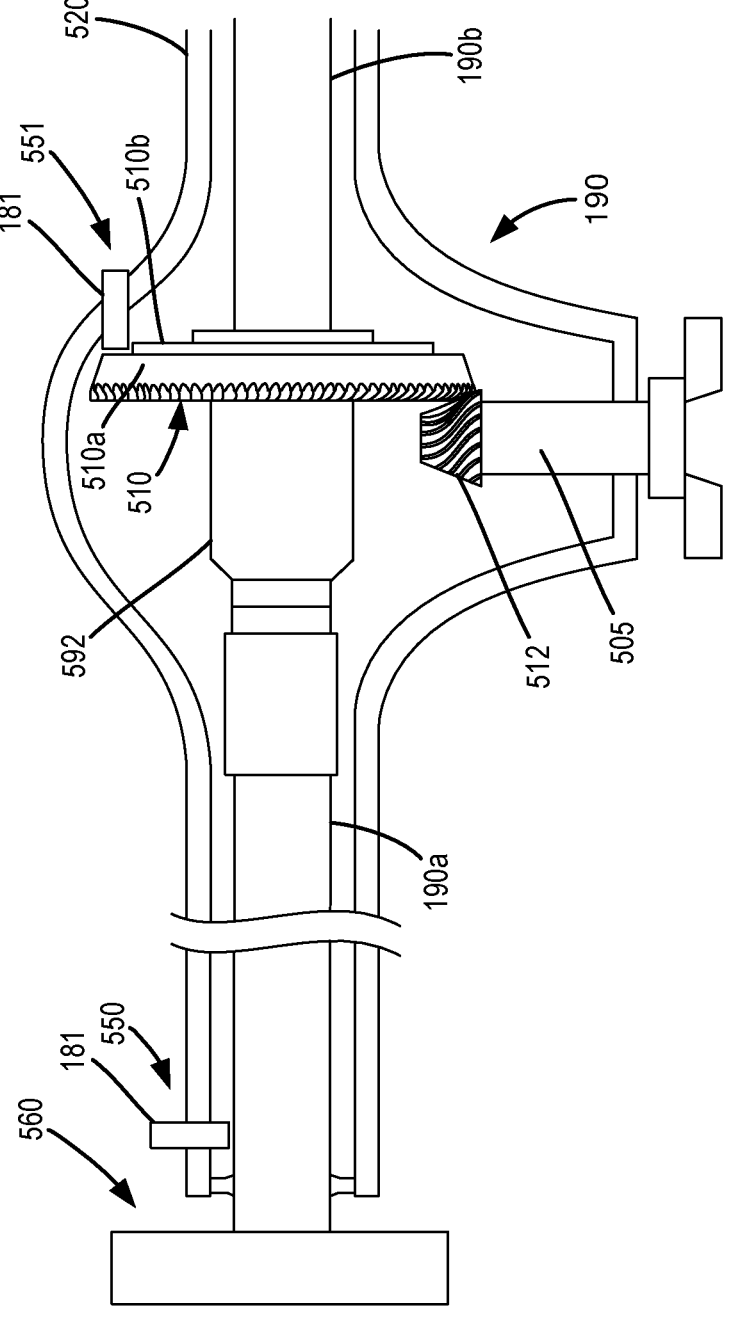
FIG. 5 shows example placements for a dynamo of a first axle.
Figure 6:
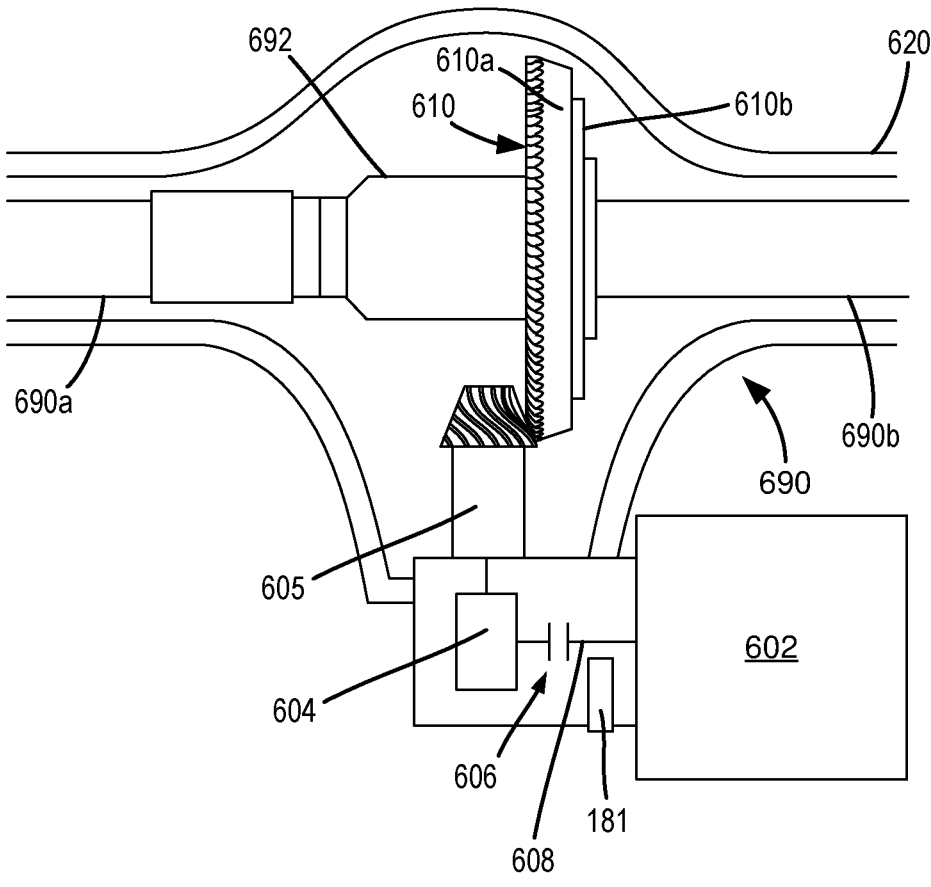
FIG. 6 shows example placements for a dynamo of a second axle.

The following description relates to systems and methods for providing electrical power to sensors and/or actuators of an axle. One or more axles may be included in a vehicle that includes a propulsion source as shown in FIG. 1. The axle system may include an electric power generation source that is driven via a rotating axle component (e.g., a shaft or gear). The electric power generation source may be electrically coupled to axle sensors and/or actuators as shown in the schematic of FIG. 2. The electric power generation source may be operated according to the method of FIG. 3. The method of FIG. 3 may operate as shown in the sequence of FIG. 4. Example placements for a dynamo of an axle are shown in FIGS. 5 and 6.

It is to be understood that the present disclosure may assume various alternative orientations and step sequences, except where expressly specified to the contrary. It is also to be understood that the specific devices and processes illustrated in the attached drawings, and described in the specification are simply exemplary embodiments of the inventive concepts disclosed herein. Therefore, specific dimensions, directions or other physical characteristics relating to the various embodiments disclosed are not to be considered as limiting, unless expressly stated otherwise.

It is within the scope of this disclosure, and as a non-limiting example, that the method and system for supplying electrical power to sensors and/or actuators of an axle may be applied in automotive, off-road vehicle, all-terrain vehicle, construction, and structural applications. As a non-limiting example, the method and system for supplying power to axle sensors and actuators disclosed herein may also be used in passenger vehicles, electric vehicles, hybrid vehicles, commercial vehicles, and autonomous vehicles.

For description purposes, the terms "engine" and "electric machine," and like terms, are used herein to indicate a power or propulsion source. The propulsion sources described herein may be fueled by energy sources including hydrocarbons and/or electricity.

As used herein, the term "controller" or "control unit" may be used interchangeably to indicate a vehicle's electronic subsystem for monitoring sensors and commanding actuators and other controllers of the vehicle or external to the vehicle.

For description purposes, a sensor is optionally configured to be a physical device, a virtual device, or a combination of the two. For example, a physical device may be configured to provide data to a controller to form a parameter used in the controller.

Disclosed herein is a system and method for supplying electrical power to sensors and/or actuators of an axle via rotation of an axle component, such as a shaft, gear, or other component. The system and method described herein may be used on any type of axle of a motor vehicle.

FIG. 1 illustrates an example vehicle driveline 199 included in vehicle 10. Mechanical connections are shown in FIG. 1 as solid lines and electrical connections are indicated as dashed lines.

Vehicle 10 includes a front side 110 and a rear side 111. Vehicle 10 includes front wheels 102 and rear wheels 103. In this example, vehicle 10 is configured as a four wheel drive vehicle; however, in other examples, vehicle 10 may be configured as a two wheel drive vehicle. In still other examples, vehicle 10 may include 6 or more axles and one or more axles may include one or more dynamos to power sensors and actuators that are associated with the axle that includes the dynamo. Vehicle 10 includes a propulsion source 12 that may selectively provide propulsive effort to rear axle 190 and front axle 101. Propulsion source 12 may be an internal combustion engine (e.g., spark ignited or diesel), or alternatively, propulsion source 12 may be an electric machine (e.g., a motor/generator), or a combination thereof. Propulsion source 12 is shown mechanically coupled to gearbox 14, and gearbox 14 is mechanically coupled to rear axle 190 and front axle 101. Propulsion source 12 may provide mechanical power to gearbox 14. Rear axle 190 and front axle 101 may receive mechanical power from gearbox 14 so that mechanical power may be transmitted to front wheels 102 and rear wheels 103.

Rear axle 190 comprises two half shafts, including a first or right half shaft 190$a$ and a second or left half shaft 190$b$. The rear axle 190 may be an integrated axle that includes a differential gear set 191, differential locking mechanism 192, differential locking mechanism actuator 193, dynamo 181, and oil temperature sensor 180. Differential gear set 191 may be open when vehicle 10 is traveling on roads and negotiating curves so that a right rear wheel may rotate at a different speed than a left rear wheel. Differential gear set 191 allows vehicle 10 to turn without dragging a right rear wheel or a left rear wheel. However, if vehicle 10 is traveling on a road surface having a low coefficient of friction or off-road, differential locking mechanism 192 may be engaged to lock rear differential 191 via differential locking mechanism actuator 193. Differential locking mechanism actuator 193 may be an electric actuator (e.g., a solenoid) that moves differential locking mechanism 192. Right and left rear wheels 103 rotate at a same speed when differential gear set 191 is locked via differential locking mechanism 192. Controller 144 may receive data wirelessly from axle sensors including weight sensor 182, suspension height sensor 183, wheel speed sensor 185, and oil temperature sensor 180. Controller 144 may also send control commands wirelessly to differential locking mechanism actuator 193.

Front axle 101 comprises two half shafts, including a first or right half shaft 101$a$ and a second or left half shaft 101$b$. The front axle 101 may be an integrated axle that includes a differential gear set 120, differential locking mechanism 122, differential locking mechanism actuator 123, dynamo 131, and oil temperature sensor 135. Differential gear set 120 may be open when vehicle 10 is traveling on roads and negotiating curves so that a right front wheel may rotate at a different speed than a left front wheel. Differential gear set 120 allows vehicle 10 to turn without dragging a right rear wheel or a left rear wheel. However, if vehicle 10 is traveling on a road surface having a low coefficient of friction or off-road, differential locking mechanism 122 may be engaged to lock rear differential gear set 120 via differential locking mechanism actuator 123. Differential locking mechanism actuator 123 may be an electric actuator (e.g., a solenoid) that moves differential locking mechanism 122. Right and left front wheels 102 rotate at a same speed when differential gear set 120 is locked via differential locking mechanism 122. Controller 144 may receive data wirelessly from axle sensors including weight sensor 142, suspension height sensor 143, wheel speed sensor 145, and oil temperature sensor 135. Controller 144 may also send control commands wirelessly to differential locking mechanism actuator 123.

Front axle 101 also includes a right knuckle 113 on its right side, a left knuckle 112 on its left side, tie rod 108, right kingpin 116, and left kingpin 115. The front axle system includes one or more steering angle sensors 175 to measure the vehicle's steering angle. In this example, the steering angle sensors 175 may monitor positions of right and left knuckles relative to right and left kingpins.

Vehicle 10 includes controller 144 and controller 144 includes read-only memory (ROM or non-transitory memory) 114, random access memory (RAM) 116, a digital processor or central processing unit (CPU) 160, and inputs and outputs (I/O) 118 (e.g., digital inputs including counters, timers, and discrete inputs, digital outputs, analog inputs, and analog outputs). Controller 144 may receive signals from sensors 154 (including axle sensors) and provide control signal outputs to actuators 156 (including axle locking actuators). Sensors 154 may include but are not limited to steering angle sensors 175, wheel speed sensors 145/185, suspension height sensors 143/183, weight sensors 142/182, and oil temperature sensors 135/180. Actuators 156 may include but are not limited to propulsion source torque actuators (e.g., throttles, inverters, fuel injectors, differential lock actuators, etc.), and transceiver 161 for wireless communication. Controller 144 may communicate with dashboard 130, propulsion source 12, sensors and actuators of front axle 101, sensors and actuators of rear axle 190, external controllers, external servers, and other controllers where present.

Vehicle 10 may also include a dashboard 130 that an operator of the vehicle may interact with. Dashboard 130 may include an interactive navigation system 134 that generates and displays trip routes responsive to user input. Dashboard 130 may further include a display system 132 configured to display information to the vehicle operator. Display system 132 may comprise, as a non-limiting example, a touchscreen, or human machine interface (HMI), display which enables the vehicle operator to view graphical information as well as input commands. In some examples, display system 132 may be connected wirelessly to the internet (not shown) via controller 144. As such, in some examples, the vehicle operator may communicate via display system 132 with an internet site or software application (app) and controller 144. Dashboard 130 and devices included therein may be supplied with electrical power via battery 139. Battery 139 may also supply power to controller 144 and a starter motor (not shown) for propulsion source 12.

Dashboard 130 may further include an operator interface 136 via which the vehicle operator may adjust the operating status of the vehicle. Specifically, the operator interface 136 may be configured to initiate and/or terminate operation of the vehicle driveline (e.g., propulsion source 12) based on an operator input. Various examples of the operator interface 136 may include interfaces that utilize a physical apparatus, such as an active key, that may be inserted into the operator interface 136 to activate the propulsion source 12 and to turn on the vehicle 10, or may be removed to shut down the propulsion source 12 and to turn off the vehicle. Other examples may include a passive key that is communicatively coupled to the operator interface 136. The passive key may be configured as an electronic key fob or a smart key that does not have to be inserted or removed from the interface 136 to operate the propulsion source 12. Still other examples may additionally or optionally use a start/stop button that is manually pressed by the operator to start or shut down the propulsion source 12. Spatial orientation of vehicle 10 and vehicle axis are indicated via axes 176.

Turning now to FIG. 2, a sketch 200 of a wiring schematic for an axle is shown. In this example, a wiring schematic is shown for front axle 101. Rear axle 190 may be wired and configured similarly.

Dynamo 181 comprises a rotor 181A and a winding 181B. Rotor 181A may include permanent magnets 181C that generate a magnetic field. When the magnetic field passes near winding 181B, a voltage is generated in winding 181B. Rotor may be coupled to a component of front axle 101 that rotates (e.g., a gear or shaft) or the permanent magnets may be placed with the rotating component of front axle 101 to operate as a rotor such that they pass by the dynamo's winding. Winding 181B is electrically coupled to a voltage controller 202 via conductors 220 and 221 to smooth voltage pulses that are generated via dynamo 181 into a nearly constant direct current (DC) voltage. The nearly constant DC voltage may be supplied to optional electric energy storage device 204 (e.g., a battery or a capacitor) and sensors and actuators of rear axle 190 (not shown). In this example, sensors and actuators that may be powered via dynamo 181 include steering angle sensor 175, oil temperature sensor 135, weight sensor 142, suspension height sensor 143, wheel speed sensor 145, and differential locking mechanism actuator 123.

Dynamo 181 generates DC electrical power when a component of front axle 101 rotates, thereby generating a DC voltage in winding 181B as a magnetic field generated by magnets 181C passes through winding 181B. If dynamo 181 is not generating electric power, power may be supplied to the sensors and actuators via electric energy storage device 204. In one example, sensors (e.g., 175, 135, 142, etc.) and actuators (e.g., 123) may be smart sensors and actuators that enter a sleep or low power mode where they wait to be activated when vehicle 10 is activated. In sleep or low power mode, sensors and actuators may not output useful signals. Upon vehicle 10 being activated, sensors and actuators may wake and begin to output useful signals that may be received via controller 144 via wireless transmission (e.g., radio frequencies or microwave frequencies).

Thus, the system of FIGS. 1 and 2 provides for an axle system for a vehicle, comprising: an axle; a dynamo mechanically coupled to the axle; and an electrical power consumer electrically coupled to the dynamo and configured to sense or adjust a state of the vehicle. In a first example, the system includes where the electric power consumer is a position sensor. In a second example that may include the first example, the system includes where the electric power consumer is an axle locking actuator. In a third example that may include one or both of the first and second examples, the system further comprises an electrical energy storage device electrically coupled to the dynamo. In a fourth example that may include one or more of the first through third examples, the system includes where the electrical power consumer is a device that is configured to transmit data wirelessly. In a fifth example that may include one or more of the first through fourth examples, the system includes where the electrical power consumer is a device that is configured to operate in a sleep mode when the vehicle is not activated. In a sixth example that may include one or more of the first through fifth examples, the system includes where the state of the vehicle is a steering angle.

Figure 3:
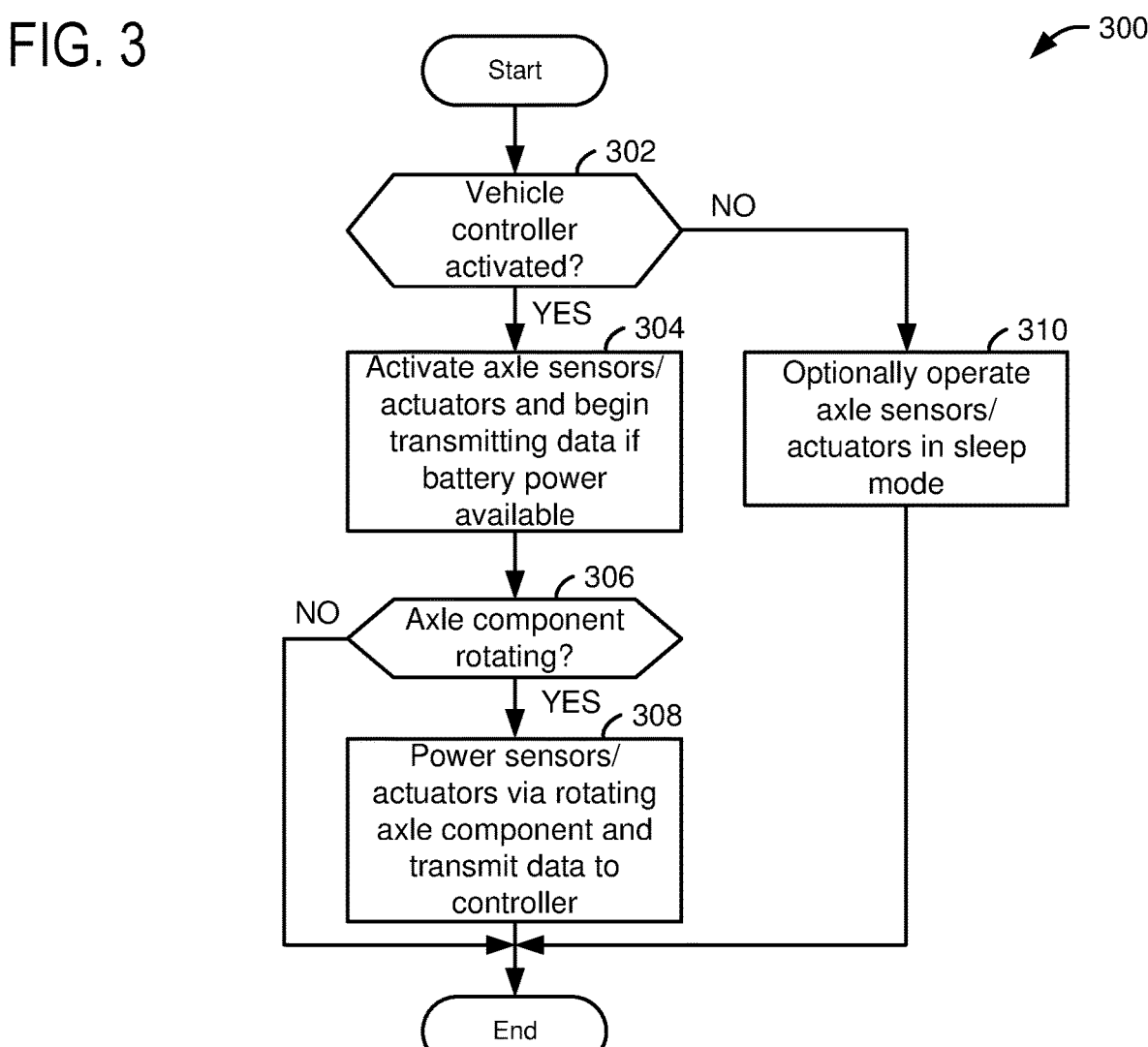
FIG. 3 shows a flowchart of a method for powering axle sensors and actuators.

Referring now to FIG. 3, an example method for providing electrical power to sensors and actuators of a vehicle axle is shown. At least portions of method FIG. 3 may be performed via components of an axle power system, which may include a controller, in cooperation with the system of FIGS. 1 and 2. In some examples, at least portions of method FIG. 3 may be incorporated as executable instructions stored in non-transitory memory of a controller. In addition, some portions of the method may be performed via the controller and/or system components transforming operating states of devices and actuators in the physical world. The method of FIG. 3 may be applied to front and rear axles of a vehicle.

At 302, method 300 judges whether or not the vehicle controller is activated. The vehicle controller may be activated in response to an operator request or an automated request made via a controller. If the vehicle controller is activated, the answer is yes and method 300 proceeds to 304. Otherwise, the answer is no and method 300 proceeds to 310.

At 310, method 300 optionally operates the axle's sensors and/or actuators in a sleep mode. In sleep mode, the sensors consume a small amount of power and their output may be deactivated. The actuators remain in a deactivated state while in sleep mode. The sensors and actuators may wake and become operational (e.g., begin outputting data or adjust an operating state of a device, such as an axle locking mechanism) in response to being powered or in response to a signal (e.g., radio or microwave signal) from the controller. For example, if the sensors and actuators are smart sensors and actuators that may receive a command signal from a controller while being powered via an electrical energy storage device, the sensors and actuators may wake an become fully operational (e.g., begin to provide output) in response to a command signal from a controller. If the sensors and actuators are not smart sensors and actuators, the sensors and actuators may be activated in response to rotation of an axle component causing electrical power to be generated via the dynamo. Method 300 proceeds to exit.

At 304, method 300 activates sensors and actuators of an axle. The sensors and actuators may be activated via a signal (e.g., radio frequency or microwave frequency signal) generated via a controller when the vehicle is activated and electrical power is available from an electrical energy storage device. The sensors and actuators begin to provide output in response to input to the sensors and actuators when the sensors and actuators are activated. Method 300 proceeds to 306.

At 306, method 300 judges whether or not a component of the axle is rotating so as to cause the dynamo to generate electrical power. If so, the answer is yes and method 300 proceeds to 308. Otherwise, the answer is no and method 300 proceeds to exit.

At 308, method 300 provides electrical power to axle sensors and actuators via the dynamo. In particular, the dynamo begins to generate electrical power when an axle component (e.g., gear or shaft) begins rotating. The electrical power that is generated via the dynamo may charge the electrical energy storage device and provide electrical power to axle sensors and actuators. The sensors and actuators may provide output when they are activated. Method 300 proceeds to exit.

Thus, the method of FIG. 3 provides for a method for operating an axle of a vehicle, comprising: generating electrical power via a component of the axle; and supplying the generated electrical power to an electrical power consumer of the axle. In a first example, the method includes where the electrical power consumer is a sensor that is mechanically coupled to the axle. In a second example that may include the first example, the method includes where the electrical power consumer is an actuator that is mechanically coupled to the axle. In a third example that may include one or both of the first and second examples, the method includes where the component is a dynamo. In a fourth example that may include one or more of the first through third examples, the method further comprises converting rotational energy of an axle component into the generated electrical power via the dynamo. In a fifth example that may include one or more of the first through fourth examples, the method includes where the axle component is a shaft. In a sixth example that may include one or more of the first through fifth examples, the method includes where the axle component is a gear. In a seventh example that may include one or more of the first through sixth examples, the method further comprises charging an electric energy storage device via the generated electrical power.

The method of FIG. 3 also provides for a method for operating an axle of a vehicle, comprising: generating electrical power via converting rotational motion of an axle component into electrical energy; supplying the generated electrical power to an electrical power consumer of an axle; and sending data representing a state of the vehicle wirelessly to a controller. In a first example, the method includes where the state of the vehicle is a temperature within the axle. In a second example that may include the first example, the method includes where the state of the vehicle is a suspension height. In a third example that may include one of both of the first and second examples, the method includes where the state of the vehicle is a weight applied to the axle. In a fourth example that may include one or more of the first through third examples, the method includes where the controller is external to the axle.

Moving on to FIG. 4, an example sequence for powering sensors and actuators of an axle is shown. The sequence of FIG. 4 may be performed according to the method of FIG. 3 in cooperation with the system of FIGS. 1 and 2. Times of interest are indicated via vertical lines at t0-t3. The plots are aligned in time and occur at the same time.

The first plot from the top of FIG. 4 is a plot of a state of a vehicle controller (e.g., 144 of FIG. 1) versus time. The vertical axis represents the operating state of the vehicle controller. The vehicle controller is deactivated when trace 402 is at a lower level near the horizontal axis. The vehicle controller is activated when trace 402 is at a higher level near the vertical axis arrow. The horizontal axis represents time and time increases from the left side of the plot to the right side of the plot. Trace 402 represents the vehicle controller operating state.

The second plot from the top of FIG. 4 is a plot of a state of an axle rotational component (e.g., gear or shaft) that causes the dynamo to generate electrical power versus time. The vertical axis represents the operating state of the axle rotational component. The axle rotational component is not rotating when trace 404 is at a lower level near the horizontal axis. The axle rotational component is rotating when trace 404 is at a higher level near the vertical axis arrow. The horizontal axis represents time and time increases from the left side of the plot to the right side of the plot. Trace 404 represents the axle rotational component operating state.

The third plot from the top of FIG. 4 is a plot of a state of an axle sensor (e.g., steering sensor, speed sensor, weight sensor, etc.) versus time. The vertical axis represents the operating state of the axle sensor. The axle sensor is deactivated when trace 406 is at a lower level near the horizontal axis. The axle sensor is activated when trace 406 is at a higher level near the vertical axis arrow. The horizontal axis represents time and time increases from the left side of the plot to the right side of the plot. Trace 406 represents the axle sensor operating state.

The fourth plot from the top of FIG. 4 is a plot of voltage of an axle power source (e.g., dynamo and battery output) versus time. The vertical axis represents the voltage output of the axle power source. The horizontal axis represents time and time increases from the left side of the plot to the right side of the plot. Trace 408 represents the axle power source voltage.

At time t0, the vehicle controller is off or deactivated and the axle rotational component is not rotating. The sensor output is zero and the voltage of the axle power source is at a higher level. In this example, the axle includes a battery and the battery voltage is reflected by the axle power source voltage.

At time t1, the vehicle controller is activated and the axle power source voltage begins to decline as battery power is consumed by axle sensors and actuators. The axle sensor is woke via a signal from the controller (not shown), and the axle sensor begins to output data while the axle rotational device is not rotating. The sensor data may be transmitted to a controller via radio frequency or microwave frequency.

At time t2, the vehicle controller remains activated and the axle rotational component begins to rotate so that the dynamo begins to generate electrical power. The sensor output remains active and the axle power source voltage begins to increase as the dynamo begins to supply electrical power to the sensor and the battery.

At time t3, the vehicle controller is deactivated and the axle component ceases rotating. The sensor is deactivated and it enters a low power sleep mode. The axle power source voltage is at a higher level.

In this way, sensors of an axle may be powered via rotational energy in an axle. Further, if the axle is not rotating and if the axle/sensor/actuator includes an electrical energy storage device, the axle's sensors and actuators may be active when components of the axle are not rotating.

Referring now to FIG. 5, a detailed view of axle 190 is shown. In particular, FIG. 5 shows a cross section of axle 190. Axle 190 includes right half shaft 190*a* and left half shaft 190*b*. Axle 190 also includes a ring gear assembly 510 that includes ring gear 510*a*. Ring gear 510*a* may be fastened to a flange 510*b* and the flange 510*b* may be coupled to a differential gear set that may be enclosed in differential gear set carrier 592. Axle housing 520 supports differential gear set carrier 592 and ring gear assembly 510.

Differential gear set carrier 592 includes a differential gear set that allows a right rear wheel to rotate at a same speed as a left rear wheel when vehicle 10 is traveling on a straight road. The differential gear set allows the right rear wheel to rotate at a different speed than the left rear wheel when vehicle 10 is negotiating curves. The differential gear set allows vehicle 10 to turn without dragging the right rear wheel or left rear wheel.

Pinion gear 512 may be driven via a propulsion source (not shown) and it engages with ring gear 510*a*. Pinion gear 512 may rotate ring gear 510a, and ring gear assembly 510 may rotate differential gears in differential gear set carrier 592 to rotate the left and right half shafts 190a and 190b. Pinion gear 512 is at one end of pinion 505. Pinion 505 may be coupled to drive shaft.

In this example, dynamo 181 is shown in two possible locations, but dynamo 181 may be positioned to sense any rotating axle component or it may be rotated by any rotating axle component. At first location 550, dynamo 181 is configured to generate electrical power from the rotation of right half shaft 190a, and dynamo 181 is positioned proximate to wheel hub 560 (e.g., within 20 centimeters of the wheel hub) so that lengths of cables from the dynamo to the sensors may be minimized. In particular, permanent magnets (not shown) may be mounted to right half shaft 190a so that when right half shaft 190a rotates, a magnetic field may pass through a winding of dynamo 181 so that dynamo 181 generates a voltage output. At second location 551, dynamo 181 is configured to generate electrical power from the rotation of ring gear 510a. In particular, permanent magnets (not shown) may be mounted to ring gear 510a so that when ring gear 510a rotates, a magnetic field may pass through a winding of dynamo 181 so that dynamo 181 generates a voltage output.

Referring now to FIG. 6, a detailed view of an alternative axle 690 is shown. In particular, FIG. 6 shows a cross section of an electrified axle that includes an electric machine 602, clutch 606, and gear set 604. Output shaft 608 of electric machine 602 may rotate permanent magnets (not shown) so that a magnetic field may pass through the winding of dynamo 181. Since dynamo 181 is upstream of clutch 606, it may generate electrical power without rotating right half shaft 690a or left half shaft 690b when clutch 606 is open. Thus, once vehicle controller 144 of FIG. 1 is activated, electric machine 602 may rotate to keep axle sensors powered whether or not the vehicle is moving. Electric machine 602 may supply torque to output shaft 608 and clutch 606 may be selectively opened and closed to transfer torque from electric machine 602 to gear set 604. Gear set 604 may cause pinion 605 to rotate.

Axle 690 includes right half shaft 690a and left half shaft 690b. Axle 690 also includes a ring gear assembly 610 that includes ring gear 610a. Ring gear 610a may be fastened to a flange 610b and the flange 610b may be coupled to a differential gear set that may be enclosed in differential gear set carrier 692. Axle housing 620 supports differential gear set carrier 692 and ring gear assembly 610.

Differential gear set carrier 692 includes a differential gear set that allows a right rear wheel to rotate at a same speed as a left rear wheel when vehicle 10 is traveling on a straight road. The differential gear set allows the right rear wheel to rotate at a different speed than the left rear wheel when vehicle 10 is negotiating curves. The differential gear set allows vehicle 10 to turn without dragging the right rear wheel or left rear wheel.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multithreading, and the like. As such, various actions, operations, and/or functions illustrated may be performed in the sequence illustrated, in parallel, or in some cases omitted. Likewise, the order of processing is not necessary to achieve the features and advantages of the examples described herein, but it is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an axle of a vehicle, comprising:
   generating electrical power via a dynamo coupled to a housing of the axle; and
   supplying the generated electrical power to an electrical power consumer of the axle, where the electrical power consumer is configured to transmit data wirelessly.

2. The method of claim 1, where the electrical power consumer is a sensor that is mechanically coupled to the axle.

3. The method of claim 1, where the electrical power consumer is an actuator that is mechanically coupled to the axle.

4. The method of claim 1, where a ring gear is between the dynamo and a differential gear set carrier.

5. The method of claim 1, further comprising converting rotational energy of a rotating axle component into the generated electrical power via the dynamo.

6. The method of claim 5, where the rotating axle component is a half shaft of the axle arranged on a flange side of a ring gear.

7. The method of claim 5, where the rotating axle component is a gear.

8. The method of claim 1, further comprising charging an electric energy storage device via the generated electrical power.

9. An axle system for a vehicle, comprising:

an axle;

a dynamo arranged between a clutch and an electric machine; and an electric power consumer electrically coupled to the dynamo and configured to sense or adjust a state of the vehicle.

10. The axle system of claim 9, where the electric power consumer is a position sensor, and wherein the clutch is configured to decouple the electric machine from the axle.

11. The axle system of claim 9, where the electric power consumer is an axle locking actuator, and wherein the dynamo is between the electric machine and a gear set.

12. The axle system of claim 9, further comprising an electrical energy storage device electrically coupled to the dynamo.

13. The axle system of claim 9, where the electric power consumer is a device that is configured to transmit data wirelessly, wherein the dynamo is configured to convert rotational energy of an output shaft of the electric machine into electrical power.

14. The axle system of claim 9, where the electric power consumer is a device that is configured to operate in a sleep mode when the vehicle is not activated.

15. The axle system of claim 9, where the state of the vehicle is a steering angle.

16. A method for operating an axle of a vehicle, comprising:

generating electrical power via a dynamo configured to convert rotational motion of an output shaft of an electric machine into electrical energy;

supplying the generated electrical power to an electric power consumer of the axle; and sending data representing a state of the vehicle wirelessly to a controller.

17. The method of claim 16, where the state of the vehicle is a temperature within the axle, and wherein a clutch is configured to control mechanical power from the output shaft to the axle.

18. The method of claim 16, where the state of the vehicle is a suspension height.

19. The method of claim 16, where the state of the vehicle is a weight applied to the axle.

20. The method of claim 16, where the controller is external to the axle.

* * * * *